(12) United States Patent
Lavanchy et al.

(10) Patent No.: US 6,758,754 B1
(45) Date of Patent: Jul. 6, 2004

(54) SYSTEM AND METHOD FOR INTERACTIVE GAME-PLAY SCHEDULED BASED ON REAL-LIFE EVENTS

(75) Inventors: Eric Robert Lavanchy, New York, NY (US); Anthony Frank Zito, Brooklyn, NY (US); Richard Edward Lamb, Pelham Manor, NY (US)

(73) Assignee: ACTV, Inc, New York, NY (US)

( * ) Notice: Subject to any disclaimer, the term of this patent is extended or adjusted under 35 U.S.C. 154(b) by 0 days.

(21) Appl. No.: 09/373,578

(22) Filed: Aug. 13, 1999

(51) Int. Cl.[7] ............................ A63F 13/00; A63F 9/24; G06F 17/00; G06F 19/00; G09B 3/00; G09B 7/00

(52) U.S. Cl. ............................... 463/42; 463/1; 463/23; 463/30; 463/31; 463/32; 463/37; 463/40; 463/43; 434/350; 434/354

(58) Field of Search ..................... 463/1–4, 7, 43, 463/23, 25, 29–36, 40, 41, 42; 434/350, 354

(56) References Cited

U.S. PATENT DOCUMENTS

| | | | | |
|---|---|---|---|---|
| 4,572,509 A | | 2/1986 | Sitrick | |
| 4,592,546 A | | 6/1986 | Fascenda et al. | 273/1 E |
| 4,877,408 A | | 10/1989 | Hartsfield | 434/350 |
| 5,114,155 A | | 5/1992 | Tillery et al. | |
| 5,359,510 A | * | 10/1994 | Sabaliauskas | 364/410 X |
| 5,462,275 A | * | 10/1995 | Lowe et al. | 273/94 X |
| 5,586,257 A | * | 12/1996 | Perlman | 463/42 X |
| 5,586,937 A | * | 12/1996 | Menashe | 463/41 X |
| 5,593,349 A | * | 1/1997 | Miguel et al. | 463/30 X |
| 5,637,844 A | * | 6/1997 | Eiba | 235/375 X |
| 5,679,075 A | | 10/1997 | Forrest et al. | 463/9 |
| 5,695,400 A | | 12/1997 | Fennell, Jr. et al. | 463/42 |
| 5,697,844 A | | 12/1997 | Von Kohorn | 463/40 |
| 5,730,654 A | * | 3/1998 | Brown | 463/1 X |
| 5,748,731 A | * | 5/1998 | Shepherd | 705/57 |
| 5,759,101 A | | 6/1998 | Von Kohorn | 463/42 |
| 5,779,549 A | * | 7/1998 | Walker et al. | 463/42 X |
| 5,796,952 A | | 8/1998 | Davis et al. | 395/200.54 |
| 5,813,006 A | | 9/1998 | Polnerow et al. | 707/10 |
| 5,823,879 A | | 10/1998 | Goldberg et al. | 463/42 |
| 5,846,132 A | | 12/1998 | Junkin | 463/42 |
| 5,855,516 A | | 1/1999 | Eiba | 463/42 |
| 5,890,906 A | | 4/1999 | Macri et al. | 434/247 |
| 5,890,963 A | | 4/1999 | Yen | 463/42 |
| 5,894,556 A | * | 4/1999 | Grimm et al. | 395/200.57 X |
| 5,917,725 A | | 6/1999 | Thacher et al. | |
| 5,941,774 A | | 8/1999 | Takemoto et al. | |
| 5,947,747 A | * | 9/1999 | Walker et al. | 434/354 X |
| 6,009,458 A | * | 12/1999 | Hawkins et al. | 709/203 X |
| 6,023,729 A | * | 2/2000 | Samuel et al. | 709/228 X |
| 6,080,063 A | | 6/2000 | Khosia | |
| 6,082,887 A | * | 7/2000 | Feuer et al. | 364/410.1 |
| 6,102,797 A | | 8/2000 | Kail | |
| 6,126,547 A | | 10/2000 | Ishimoto et al. | |
| 6,292,780 B1 | * | 9/2001 | Doederlein et al. | 704/270 |
| RE37,957 E | * | 1/2003 | Garfield | 273/308 |

OTHER PUBLICATIONS

PCT–International Search Report dated Oct. 5, 2001 for Application No. PCT/US00/22091, filed Aug. 14, 2000.

* cited by examiner

*Primary Examiner*—Teresa Walberg
*Assistant Examiner*—Binh-An D. Nguyen
(74) *Attorney, Agent, or Firm*—Morrison & Foerster LLP

(57) ABSTRACT

A method and system for providing on-line game competition are provided. Players select their favorite teams, join with other fans of the team, and compete against players on the opposite team. Teams compete against each other in matches, where matches are based on schedules of real-life events, such as sports schedules or entertainment schedules. Players are grouped with other players associated with their favorite teams, and matches are organized. Various trivia questions may be presented, and players have a predetermined period of time to answer the questions. Points may be awarded based on a player's success in competition and the overall teams success in matches. Further, prizes are awarded based on points received by a player.

31 Claims, 9 Drawing Sheets

SYSTEM AND METHOD FOR INTERACTIVE GAME-PLAY SCHEDULED BASED ON REAL-LIFE EVENTS

FIELD OF THE INVENTION

The present invention relates generally to games, and more specifically to online electronic team games of trivia scheduled based on real-life events.

BACKGROUND OF THE INVENTION

Competitive games are a well known form of recreation. These games may include physical activities, such as basketball or baseball, or more inactive games, such as "board games" like Monopoly™ and Trivial Pursuit™ Advances in technology have added new games and altered existing games. These advances in technology allow games such as basketball, baseball, or Monopoly™ to played in an electronic format.

Competitive games may be enjoyable because participants can interact with others in friendly competition. Electronic games, however, may suffer from the drawback of reducing the number of people who can participate together in a game. Many current electronic video games are limited to two players competing against each other. This limits who can participate.

Additionally, many conventional games are limited by geography. Players may only compete with other players nearby. To participate, a player may have to travel large distances at great expense to reach a competition. This may discourage players from competing in various contests.

Conventional electronic games may also have a drawback of not establishing competition among a community of players with common interests. Many electronic games are limited to a schedule(s) created by the game manufacturer. These games do not incorporate real-life competition and/or preexisting loyalties held by players. While a player may have a preexisting loyalty to a college football team, for example, existing electronic games do not specifically use these loyalties to promote competition in the electronic games.

These and other drawbacks exist.

SUMMARY OF THE INVENTION

An object of the present invention is to overcome these and other drawbacks in existing systems and methods.

Another object of the invention is to provide systems and methods for allowing a plurality of players to electronically compete in contests against each other.

Another object of the invention is to provide systems and methods for allowing a plurality of players to be teamed together, based at least in part on player profiles, and matching teams of players against each other in a competition.

Another object of the invention is to provide systems and methods for matching teams of players against each other in competition based on real-life events.

Another object of the invention is to provide systems and methods for grouping players into teams based on player-selected sports teams and matching teams according to a real-life sports schedule.

Another object of the invention is to provide systems and methods for creating a compelling multi-player experience as well as foster a community of like-minded sports fans.

Another object of the invention is to provide systems and methods for fostering player loyalty driven by pre-existing, strongly held loyalties to sports teams.

Another object of the invention is to provide systems and methods for allowing a player to receive a score for a contest based on the performance of the player in the contest and based on the performance of the player's team in the contest.

Another object of the invention is to provide systems and methods for allowing a plurality of players to compete in a trivia based competition by presenting players with a series of questions and tallying the responses provided by the players.

Another object of the invention is to provide systems and methods for providing the opportunity for players to accumulate chances to win prizes while participating in competition with and against a plurality of other players.

Another object of the invention is to provide systems and methods for providing branding opportunities for partners and clients who sponsor player competition.

Another object of the invention is to provide systems and methods for providing a sizable value-added content to existing online sports content providers who sponsor player competition.

These and other objects of the invention are accomplished according to various embodiments of the invention. According to one embodiment of the invention, a plurality of players register to compete. Players are placed on teams based on a player's indication of team preferences. Teams are matched based on real-life events. The score of the competition is tallied, and the players are awarded scores based on the player's individual performance and teams performance.

Other objects and advantages exist for the present invention.

DETAILED DESCRIPTION OF THE PREFERRED EMBODIMENTS

The present invention is described in relation to an internet based world wide web interface system that players access using a web browser. In this environment, the present invention provides online electronic team-oriented games of trivia with matches that are scheduled based on real-life events. Nonetheless, the characteristics and parameters pertaining to the electronic team games are equally applicable to other types of competition.

For purposes of explaining the present invention, an embodiment of the present invention is set forth. A player may use a browser to connect over the internet to a server program and logon to an electronic team game of trivia. A player profile may include teams a player selects to be associated with or against, such as a favorite team and a least-favorite or rival team.

Using the browser, the player logs on to the system and selects a team to play for. A player may be prevented from playing for a least favorite team or against a favorite team. A team page may be presented to the player, and may display a game to be played, where the game corresponds to a real-life schedule, and various matches. Matches involve players from one team competing against players from another team. A player may be placed in an appropriate match by the system, may select to join a match, or may create a new match. Computer-controlled players, or "bots," may be added to keep sides even. A match may begin with the system presenting a question and various answer possibilities to the players, who may select an answer or pass on a question. After a predetermined period of time has passed, the system may present the correct answer to the player. The number of correct answers for each player, as well as for the teams, may be tallied after each answer is presented. A match may comprise a predetermined number of questions.

Scores may be awarded based on the number of correct answers, both by the team as a whole and by the individual players. At the end of the match, a player may be awarded a final score based on the number of questions correctly answered, the match results and the team results. Tickets may be used as a method of counting awards points for a player based on a players score, with more tickets being awarded for higher scores. Prizes may be raffled by drawing from the tickets awarded to players. A more detailed explanation of various features and elements of the present invention will now be given.

Figure 2:
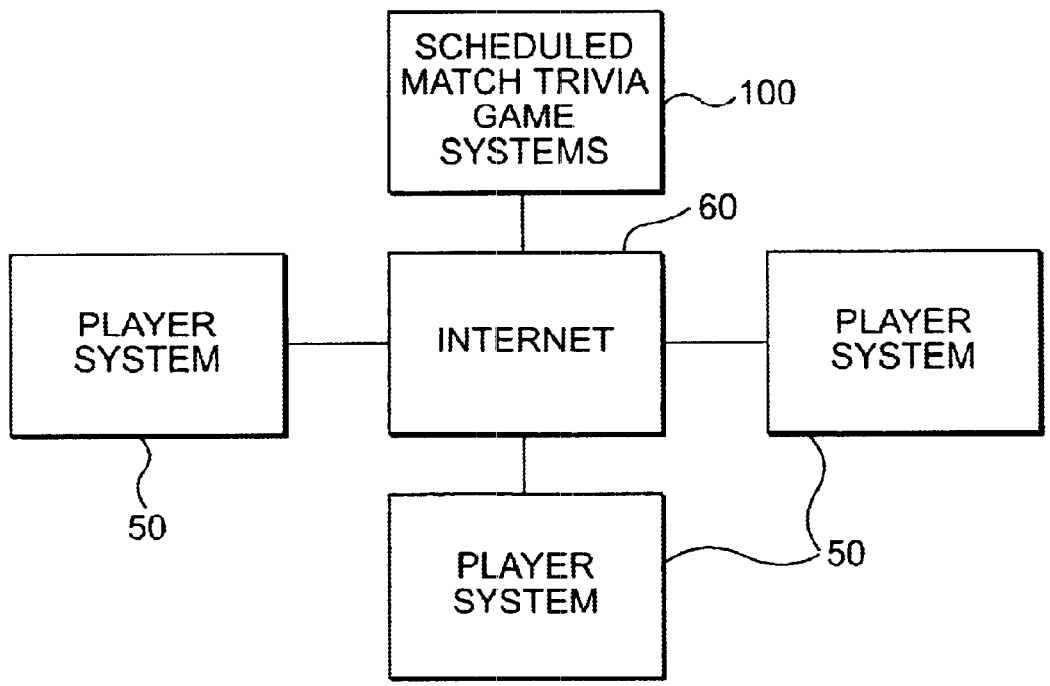
FIG. 2 depicts a schematic diagram of a hardware system according to an embodiment of the invention.

According to an embodiment of the invention, a multi-player game, such as a trivia game, may be provided in which players cooperatively determine the outcome of matches which are scheduled based on real-life games/schedules. According to an embodiment of the invention, a player may use any known internet browser, such as Netscape™ 4.0 or higher, or Microsoft Internet Explorer™ 4.0 or higher, or other browsers may also be used. The player may use this browser 50 to connect over the internet 60 to a server, as shown in FIG. 2. The method of implementing the present invention may comprise various steps, including login/registration, match management, match play, awarding scores, and awarding prizes. Other steps may also be included.

Figure 1:
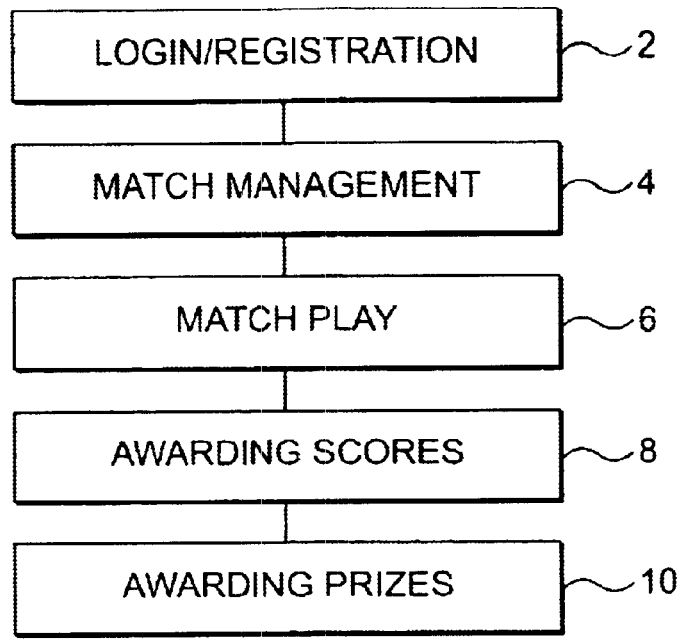
FIG. 1 is a flowchart of am embodiment of a method according to the invention.

FIG. 1 is a flowchart illustrating an embodiment of the present invention, including the steps of "Login/Registration" (step 2), "Match Management" (step 4), "Match Play" (step 6), "Awarding Scores" (step 8), and "Awarding Prizes" (step 10). The present invention may also include additional steps, or may be performed without certain steps. The steps associated with FIG. 1 that may be included in the present invention are now described in more detail.

As noted above, the system provides for players to login and register before playing a game in login/registration step 2. First time players may register with the system by entering information to allow identification of that player. Upon registering, the player may be assigned or may select a username and password for logging into the system. Once a player registers, or if a player has previously registered, a player may log into a system. Other login procedures may also be used.

In step 4, the system initiates procedures to manage a match. The system may organize a plurality of players into teams and match a plurality of teams to allow for competition. Players may be organized into a team based on player profiles. Teams may then compete in matches against one or more other teams. According to an embodiment of the invention, teams comprise a limited number of players per match. Computer-controlled players, or "bots" may be used to ensure that each team has the desired number of players. For example, if a match was set to be six on six, but one side only had five players when the match was scheduled to begin, a bot would be added to make the sixth player. The scores of each player may be weighted depending upon the number of players on a team. For example, if one team has eight players and another team has four players, the scores of the eight player team may be worth only half as much as the score of the four player team. Other embodiments may also be used.

A player may be directly placed into a team that is currently competing in a match. According to an embodiment of the invention, a player may be placed within the most appropriate match available as described in detail below. A player may also select to join a particular match, or may also select to create a new match. Matches may also be combined to reduce the total number of matches. Other methods of match management may also occur, as described below.

Once a match has been established, the system may provide for match play in step 6. A roster of players on a team and a chat area may be presented, allowing a player to converse with other players while competing in matches. Game play may be presented to a player to allow competition to occur, and may comprise presenting various questions and answer choices. The correct answer may be displayed, and correct answers to a question by each player and team may be tallied. Other methods of match play may also occur.

The system may also provide for awarding scores to the teams and the players in step 8. Each player may be awarded a score based on the performance of the player and the performance of the player's team. For example, a player may be awarded a score based on the number of questions correctly answered. A team victory may result in a higher score for the player. Other scoring methods may also be used, as described in detail below.

The system may also provide for awarding prizes to the players in step 10. Prizes may be awarded to a player(s) based on the score received by the player, as described below. For example, a raffle system may be used to award prizes. Each player may receive "tickets" based on their score, with more tickets being awarded to a player with a higher score. A drawing may then determine which player receives the prize. Other methods for awarding prizes may also be used.

To perform these and other functions, a scheduled match trivia game system 100, according to an embodiment of the invention, may be provided. System 100 may comprise one or more of the following modules: web shell 102, a player management module 104, match management module 106, match module 108, chat module 110, game logic module 112, interaction server 114, content module 116, game management module 118, prize/winner module 120, and advertising/sponsorship module 122. The operation of each of these modules is provided in detail below. In general, web shell 102 may include web pages providing a primary interface to non-game play functions, such as login, game/ match information, player trading cards, help, and other functions. Player management module 104 may maintain player information (e.g., username, real name, personal statistics, team affiliation(s), etc.) and manage registration of new players and login of existing players. Player management module 104 may allow a player to change some of the stored information to allow a player to customize a player profile or personal "trading card."

Match management module 106 may maintain a pool of current matches, manage initiation of new matches, and place players into matches. Match module 108 may also contain one or more sub-modules, including a chat module 110 that supplies in-match chat functionality, a game logic module 112 that provides game logic, handles match scoring, interfaces with content management module 116 to obtain trivia content, sends "Referee" (or system administration) messages via chat module 110, provides prize ticket data to player management module 104 at the conclusion of a contest or game and updates a "Recent Players" ticker at the conclusion of a contest or game, and an interaction server 114 or "Match Marshall," that may be responsible for synchronizing with clients who sponsor a system, distributing content (e.g., question/answer data, etc.), and handling incoming messages from a client who sponsors a system. A client-side application (e.g., a client website) may incorporate part of the chat and game logic functionality. Client-side applications may include programs written in Java™, Shockwave™, or other programming languages.

Content management module 116 may generate and provide game or contest information to game logic module 112, which may include trivia questions and answers. Game management module 118 may maintain a pool of current games, a schedule of games for a season, scores of current games, and team win/loss records.

Prize/winner management module 120 may select winners periodically based on prize ticket data, and may generate and distribute winner reports for prize fulfillment. Advertising/sponsorship module 122 may provide advertising and sponsorship content to web shell 102. A more detailed description of system 100 and various modules which may be contained therein is described now.

Web shell 102 may comprise the central control component of the system that provides global navigation for a player that accesses the system. As described above, system 100 may comprise a server system that provides web access to the team-based match play system described herein. That system may present a series of web pages to players engaged in play of the game. Accordingly, web shell 102 may provide the underlying interface mechanism to allow users to navigate the pages in the site and determine the content of pages that are presented to the players. According to an embodiment of the invention, every page provided at the web shell may have a set of textual links to areas of a web site, including a home page, a table of contents of a help section, a prize page, and a player information editing page. Other links may also be provided. According to an embodiment of the invention, a player information editing page may be provided only when a player has logged in. Depending on the situation (e.g., a player is logged in, or not logged in, location within site, etc.), there may be additional links.

Web shell 102 may also present a splash screen to introduce a player upon logging into the system. According to an embodiment of the invention, an introductory splash screen may containing a product name and logo, an animation or movie, audio or other content. After a predetermined period of time (e.g., after an image or animation has had time to load), or if the player clicks on a logo, a player may be taken to a home page.

A home page may be a central hub page to introduce concepts, explain procedures and rules, and present various aspects of the competition. A home page may display all games in progress along with the game status and score of each of those games. An interface may be provided on a home page to allow a player to login/register. According to an embodiment of the invention, a home page may display a brief paragraph introducing the competition and explaining how it work. For example, a player may receive instructions that the competition is a trivia game based on sports. Other types of competition may also be used. A list of matches in progress may be presented and current scores, with winning team listed first, e.g.: winner's fans 255, loser's fans 210, as well as the number of people playing. Clicking on one of these matches may take a player to an appropriate game information page. A home page may further have a link to a game schedule, a link to a prize page, and a login box for login and/or registration.

Web shell 102 may include a match information page, which may present all available information for a selected match (team X vs. team Y), and allow a player to access a team locker room for either competing side. A match information page may present the current score for each team, and the number of players playing for each team. According to an embodiment of the invention, teams may be referred to not simply as "Team X," but as "Team X fans," to indicate that competition is between the fans and not the actual teams. A match information page may also indicate when a match is scheduled to end.

According to an embodiment of the invention, a match information page may present a login box to a player. A player may activate an appropriate softkey or button (e.g., "Click here to play for Team X" and "Click here to play for Team Y") to link to an appropriate team locker room page.

A match information page may also present information about match results. According to an embodiment of the invention, a match results ticker may be presented as a right to left scrolling ticker which displays various information about recently finished matches. Match result information may be displayed in other manners. Information displayed on a match results ticker may include a username of a player, the city and state where a player is from, and the number of prize tickets earned by a player in a particular match. According to an embodiment of the invention, a ticker may hold a maximum number (such as 22, for example) of names, with each new addition pushing the oldest off of the list. Other information may also be displayed.

Web shell 102 may also include a team locker room page. A team locker room page may be a "home base" for a particular team, providing access to all team-specific information. A team locker room page may present a score for games in which that team is competing. As noted previously, according to an embodiment of the invention, teams may be referred to not simply as "Team X" but as "Team X fans" to indicate that the competition is between the fans and not the actual teams. According to an embodiment of the invention, a team may be involved in a plurality of matches. For example, Team X may have 20 fans competing in 3 matches. Results of all matches may be displayed on a team locker room page, as well as the combined results of the matches. If there is no match for a particular day, or week, a message may be presented that indicates this fact. For example, the phrase "Team X fans are not currently playing a game" may be displayed on a team locker room page.

A team locker room page may also indicate when a game is scheduled to end, if there is a game. A player may activate a button to enter a particular game, or may activate a button to select or create a new game. A login box may be presented on a team locker room page to allow a player to login to a selected game.

Web shell 102 may include a game page, which displays information about a specific game. A game page may indicate which teams are playing, the number of players participating for each team, and the overall score for the game. A game page may also allow a player to enter a team locker room page. According to an embodiment of the invention, a ticker may display information about players and the game, including the rankings and prize points of players, the results and status of matches, and other information. Other information may be displayed on a game page.

Figure 7:
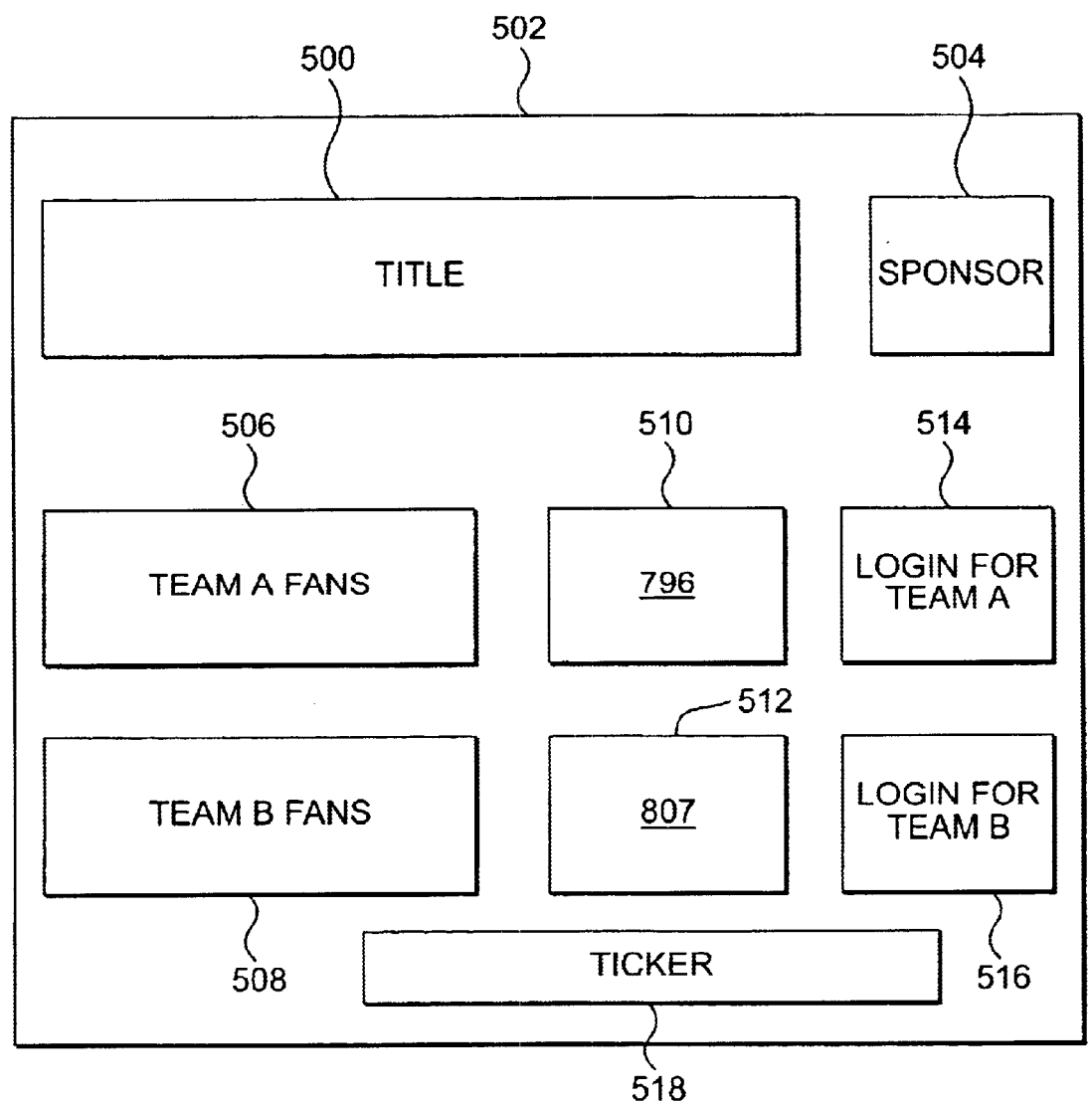
FIG. 7 illustrates a graphical user interface depicting a game page according to an embodiment of the invention.

FIG. 7 illustrates a graphical user interface depicting a game page according to an embodiment of the invention. Game page 500 may display a title 502, where the title identifies the game, and a sponsor logo 504. For example, a title may indicate a regular season game, a noted rivalry, a play-off game, or other information about the game. Sponsor logo 504 may identify the owner or sponsor of the website where the system is located.

Logos indicating Team A's fans 506, and Team B's fans 508 may be displayed, along with the score accumulated by Team A's fans, 510, and the score accumulated by Team B's fans 512. Game page 500 may also display a login for Team A' fans and a login for Team B's fans, at 514 and 516, respectively. According to an embodiment of the invention, a pop-up registration window may appear when login 514 or 516 is selected by a player. The pop-up registration may prompt a player to enter the appropriate username and password to login to the system. A team locker room page may then be presented to a player.

Game page 500 may also present a ticker 518, which may comprise a left to right scrolling ticker presenting information about the game. Ticker 518 may scroll information about players, including a player's score, match results, the number of players participating, and other information. Game page 500 may display other information as well.

Web shell 102 may also include a fan ranking page. A fan ranking page may present a list of players. According to an embodiment of the invention, a fan ranking page may present a list of the top players, such as the top ten players, as well as information about the players. Information may include a username, city, state, win/loss record of a player, and other information. A fan ranking page may provide a goal for players to achieve, thereby increasing the challenge and incentive for competition.

According to an embodiment of the present invention, each player may have a player profile or personal "trading card." A personal trading card may be a page which presents a player's personal statistics, as well as some user information. According to an embodiment of the present invention, a personal trading card may present a player's name, an image of a player, the city and state of the player, and a player's favorite and least favorite teams. A personal trading card may appear as an electronic version of known trading cards, such as baseball cards. A personal trading card may also present a player's statistics. According to an embodiment of the invention, a personal trading card may present results of a player's competitions. Results may include the won/loss record of the player's teams, the percentage of correct answers a player has provided, and the total prize tickets earned by a player. Other information may also be presented.

Figure 8:
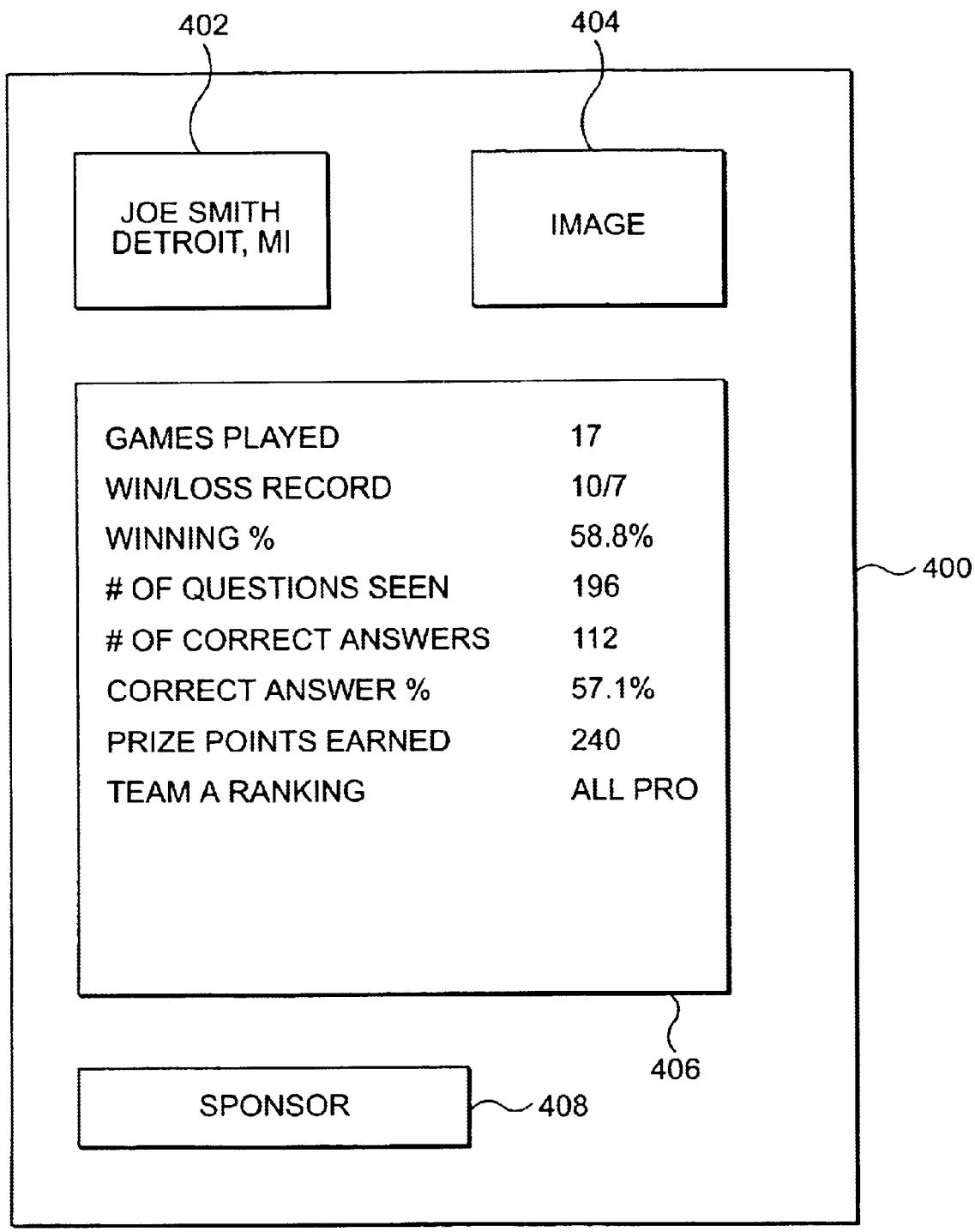
FIG. 8 illustrates a graphical user interface depicting a personal trading card according to an embodiment of the invention.

FIG. 8 illustrates a graphical user interface depicting a personal trading card according to an embodiment of the invention. A personal trading card 400 may display the name and address of a player 402 as well as an image of the player 404. According to an embodiment of the invention, a player name and address may comprise a real name, a username, and the city and state of residence. Other information may also be included.

A personal tracking card may also display player statistics 406, which include the number of games played, a player's win/loss record, a player's winning percentage, the number of questions seen by a player, the number of questions answered correctly by a player, the percentage of correct answers, the prize points, or score awarded, and any ranking or level achieved by a player. Other information may also be included. A personal trading card 400 may also display a sponsor logo is 408 for advertising purposes. Other embodiments of personal trading cards may also be used.

Web shell 102 may include a game schedule page that displays a schedule of games, including games in progress, games already played, and games to be played. A game schedule page may indicate a schedule for a particular team, a plurality of teams, or all teams. According to an embodiment of the invention, a game schedule may be based on real-life events. For example, the system may provide various teams associated with the National Football League™ ("NFL"), such as the Detroit Lions™, the Cincinnati Bengals™, and the Seattle Seahawks™ football teams. The real-life schedule for the NFL may include the Detroit Lions™ playing the Cincinnati Bengals™ in week one, and the Cincinnati Bengals™ playing the Seattle Seahawks™ in week two. Matches between fans of the teams may be played according to the schedule. Thus, the Detroit Lions™ fans would play the Cincinnati Bengals™ fans in matches in week one, and the Cincinnati Bengals™ fans would play the Seattle Seahawks™ fans in matches in week two. Other sporting event schedules may be used for coordinating matches, including professional and college sports, such as basketball, baseball, hockey, tennis, golf, boxing, or other sports. World sporting events, such as World Cup Soccer, Davis Cup Tennis, the Olympics™, or other events may also be used. Additionally, non-sporting events may be used for competition, including events such as the Oscars™ (e.g., fans of various nominees can compete), Emmys™, Cannes Film Festival, elections (e.g., Republicans vs. Democrats, supporters of rival candidates, etc.), large public trials (e.g., Microsoft™ vs. the U.S. Government in an antitrust trial), or any other real-life scheduled event that may rouse excitement or passions among potential players.

A prize page may be included in web shell 102. A prize page may display current prizes and recent winners. Other information may also be displayed. Other pages may also be included in web shell 102.

Player management module 104 may comprise a database to store personal player information, including the player's personal trading card. Personal player information may include a username, password, e-mail address, date of birth, first name, last name, address, city, state, zip code, opt-in, and other information. Opt-in is a method of compliance with generally recognized consumer privacy policies, whereby a user indicate acceptance of correspondence from the server program, for example by checking a box or otherwise providing a positive acknowledgment. A negative acknowledgment may occur when a user is considered to be opted-in unless steps are taken to opt-out. A database may also store player competition information, which may include the number of matches played, the number of questions answered, the number of questions answered correctly, the number of questions passed, the number of prize tickets awarded, the number of games played in, and the number of games won. Player competition information may also include the date the last prize was won, a team affiliation, and a team rivalry (negative affiliation). A team affiliation and a team rivalry may be selected when a player registers. Player management module 104 may also login and register players as described below with respect to FIG. 3.

Match management module 106 may organize a plurality of players from a team into groups, and organize a plurality of groups into matches. According to an embodiment of the invention, a player may be presented with various options. A player may select to directly enter a match, whereby a player may then be placed straight into an appropriate match. If a player attempts to play against his/her affiliation team, an alert dialog may also be displayed, and may prevent a player from playing against a favorite team and losing on purpose. If the user is trying to play for his/her rival team, an alert dialog may also be displayed to prevent a player from playing for a rival team and losing on purpose. If no current matches have been formed when the player selects to enter a match, a new match may be created. According to an embodiment of the invention, a new match may be referred to as "<username>'s Match", where the <username>'s refers to the first player in the match. When placing a player in an appropriate match, the difference between the number of human players on each side in the unstarted matches available may be determined, and a player may be placed in the match that has the greatest deficiency of human players on his side. Other methods may also be used to determine an appropriate match. According to an embodiment of the invention, computer-controlled players, which may be referred to as "bots," may be used to fill in matches which are uneven.

By way of example only, suppose on Nov. 6, 2000, the New York Jets™ are playing the New York Giants™. On Nov. 4, 2000, Player Tony, who is looking for a match as a Jets fan, may login and select to enter a match. Suppose at that time, there are three unstarted matches. Match #1 may have 6 human Giants fans and 4 human (and 2 bots) Jets fans. Match #2 may have 4 human (and 4 bots) Giants fans and 8 Jets fans. Match #3 may have 10 Giants fans and 6 human (and 4 bots) Jets fans. Tony would be placed in Match #3, replacing a bot, because Jets fans are outnumbered by four (4) in that match, more than any other match.

If more than one match has the same disparity of players from one team with players from another team, the system may place a player in a match with the fewest human players. For example, if in the example above, Match #1 had only 2 human Jets fans (and 4 bots), the difference between sides would be the same as in Match #3. Tony would be placed in Match #1, which has fewer human players. If more than one match has the same difference between sides and has an equal number of human players, a player may be randomly assigned to one of these matches. Other methods for assigning players may also be used.

A player may also select a match or create a match when that player logs in. Players may be taken to a lobby page, where current matches for a selected game may be listed and dynamically updated. Matches listed may include information about a match name, the total number of players in the match, and the score of each team. The match name may be selected by a player who created the match or assigned by the system. Other information may also be included.

A player may select an existing match, whereby the player is taken to that match, and introduced into match module 108, or the player may select to create a new match. If the player desires to create a new match, the player may activate a create match button, a new match may be initiated with the player's name, and the player may be taken into the new match.

According to an embodiment of the invention, existing matches may be combined. When a new match is created, a check may be performed to see if multiple matches can be combined in order to reduce the number of bots in the game system, and facilitate more interesting, lively chat and gameplay. Checking matches for combinations may be performed at predetermined time-intervals, or may be based on the number of human players. According to an embodiment of the invention, matches may be combined in such a way as to never split up existing matches. That is, matches are combined only if a match can be moved intact into another match, with enough room for all of the players. Other methods of combining matches may also be used.

According to an embodiment of the invention, when determining whether to combine matches, a system may check if any other matches are forming. If there are other matching forming, a system may determine if there are enough open slots in a current match for the other match's players to fit into the current match. If not, the next available forming match may be checked. If so, a system may determine the difference, X, between the number of players on each side if the matches were combined. This number, X, may be an index of the suitability of combining the matches, where lower numbers are better. If $X=\emptyset$, the matches may be combined. According to an embodiment of the invention, a current match may be combined with the match with the lowest value of X, i.e., the smallest difference created between the two sides. If more than one combination results in the same value for X, matches may be combined randomly with matches of the same X value. Other methods for combining matches may also be used.

Match module 108 may be used to facilitate gameplay and competition. As noted above, match module 108 includes chat module 110, game logic module 112, and interaction server 114. According to an embodiment of the invention, upon entering a match, a player may be presented with a screen including: a scrolling chat window, with a field for entering chat messages; a list of the players currently in the match on one team; a list of the players currently in the match on the other team; and a main game panel, where questions and answers may appear. Other information may be presented as well.

According to an embodiment of the invention, audio and visual media may be used to present the information, and to add excitement for a player. A player's name and team may be announced, or video highlights of the team from a real-life game may be played. Other options may also be used.

According to an embodiment of the invention, game-play begins at a predetermined time, or does not begin until there are at least a predetermined number of human players on a side. Chat may be active while the players wait for the game to begin, thereby allowing interaction between the players to occur is whiling waiting for a match to begin.

A roster list of players for each team currently in the match may be displayed. According to an embodiment of the invention, players who are playing as fans of the visiting team may be displayed on the left side, and fans of the home team may be displayed on the right side. A home team and a visiting team may be designated based on a real-life match-up. Each player may have individual performance statistics located near the player's name. According to an embodiment of the invention, the statistic format may be x/y, where "x" is the number of questions the player has answered correctly in the match, and "y" is the number of questions seen by the player. Clicking on a player's name (including one's own) name may bring up a new window which contains that player's personal trading card. Other formats may also be used.

Rosters may dynamically fill and empty while a match is forming, as players decide whether or not to play. A player may also join matches in progress. A roster may also dynamically sort in order of percentage of correct answers, with the top percentage players for each side being at the top of the roster. Sorting players may occur after scores for each question are tallied. Other methods for displaying rosters may also be used.

A chat area may be presented to a player to allow communication between players while competing and may be monitored by chat module 110. According to an embodiment of the invention, a scrollable chat window may be presented at the bottom of the screen. A keyboard cursor may be focused on the chat entry field, so that a player does not have to click on the chat entry field to begin typing. A chat entry field may perform according to known chat entry fields, or may have specific instructions for using the chat entry field which may be communicated to a player. A message in a chat field may appear in a variety of formats. According to an embodiment of the invention, a player's chat message may be displayed in the color appropriate for that player's team (e.g., blue for visitor, red for home). Messages from those not participating (e.g., referee messages, messages from the system announcing certain conditions or events, etc.), may appear in a third color under a specified name, such as a username "Referee."

A player may use additional features as well. According to an embodiment of the invention, a player may chat by "emoting." Emoting may be described as the ability to describe an action rather than simply "speaking." For example, by prefacing text entered into the chat input field with the colon character (":"), the text which follows may appear after the name rather than appearing as normal spoken text. For example, a player with a username "Elava" may type into a chat input field "I'm sleepy." The chat window may display "Elava>I'm sleepy." However, if Elava types ": is sleepy," the chat window may display "Elava is sleepy." Other features may also be used in connection with the chat feature.

According to an embodiment of the invention, gameplay may begin when a match has a predetermined number of human players on either side. As noted above, this may be accomplished by a combination of users joining the match, adding bots, and underpopulated matches being combined by the match management module 106. By way of example only, when there are six human players on either side, an announcement from a referee may indicate that a game is set to begin within a predetermined time period. After the predetermined time period has passed, and assuming there are still at least six players on one side, the side with the fewer players may be supplied enough computer-controlled players ("bots") to even the sides. At that point, the referee may announce in the chat window that the game is about to begin. There may be a corresponding voice-over component to this announcement.

According to an embodiment of the invention, gameplay may take place in a central portion of a display, and may comprise a series of multiple-choice trivia questions. Other types of contests may also be presented to players, and the display of the contests may vary depending on the type of contest. Game Logic Module 112 may interact with Content Management Module 116 to obtain contest data. According to a preferred embodiment of the invention, all players see the same question at the same time. According to an embodiment of the invention, players are given a predetermined period of time to answer each question. Therefore, a clock may count down the time players have to answer each question. The player may have the full allotment of time to select an answer. According to an embodiment of the invention, a player may change an answer as often as is desired within that time-frame by, for example, selecting the new answer that is desired. After each question, the answer may be revealed along with a short factual statement about the question/answer, and then the points may be tallied up. According to an embodiment of the invention, each player's correct answers may be worth +1 point, incorrect answers may be worth −1 point, and "passing", or not answering a question, may be worth 0 points. Other scoring methods may also be used.

A question screen may comprise a question, a predetermined number of multiple choice answers, a "pass" button, a timer, the location of the question with a sequence of questions (e.g, first, second, last, etc.) and a current match score. Other information may be presented on a question screen. A question screen may also indicate if a question is a bonus question. Bonus questions will be described in more detail below.

When a question is presented to players, a timer may begin counting as soon as all answers have been displayed. Answers may have a rollover state as well as a selected state, as does the "Pass" button. Rollover state may be the detection that the mouse cursor is positioned over an object, such as a particular line of text. Selected state may be the acknowledgment that the mouse cursor is positioned over an object, and that the object has received a mouse click. According to an embodiment of the invention, the full allotment of time must expire before a player is advanced to the answer screen. A player may change a selected answer at any time until time expires. An answer (or "Pass" button) that is selected when time expires is the one that is submitted for evaluation. According to an embodiment of the invention, not answering at all may be scored as a "pass," but if a player fails to answer a predetermined number of questions in succession, the players is disconnected from the match due to inactivity.

Figure 4A:
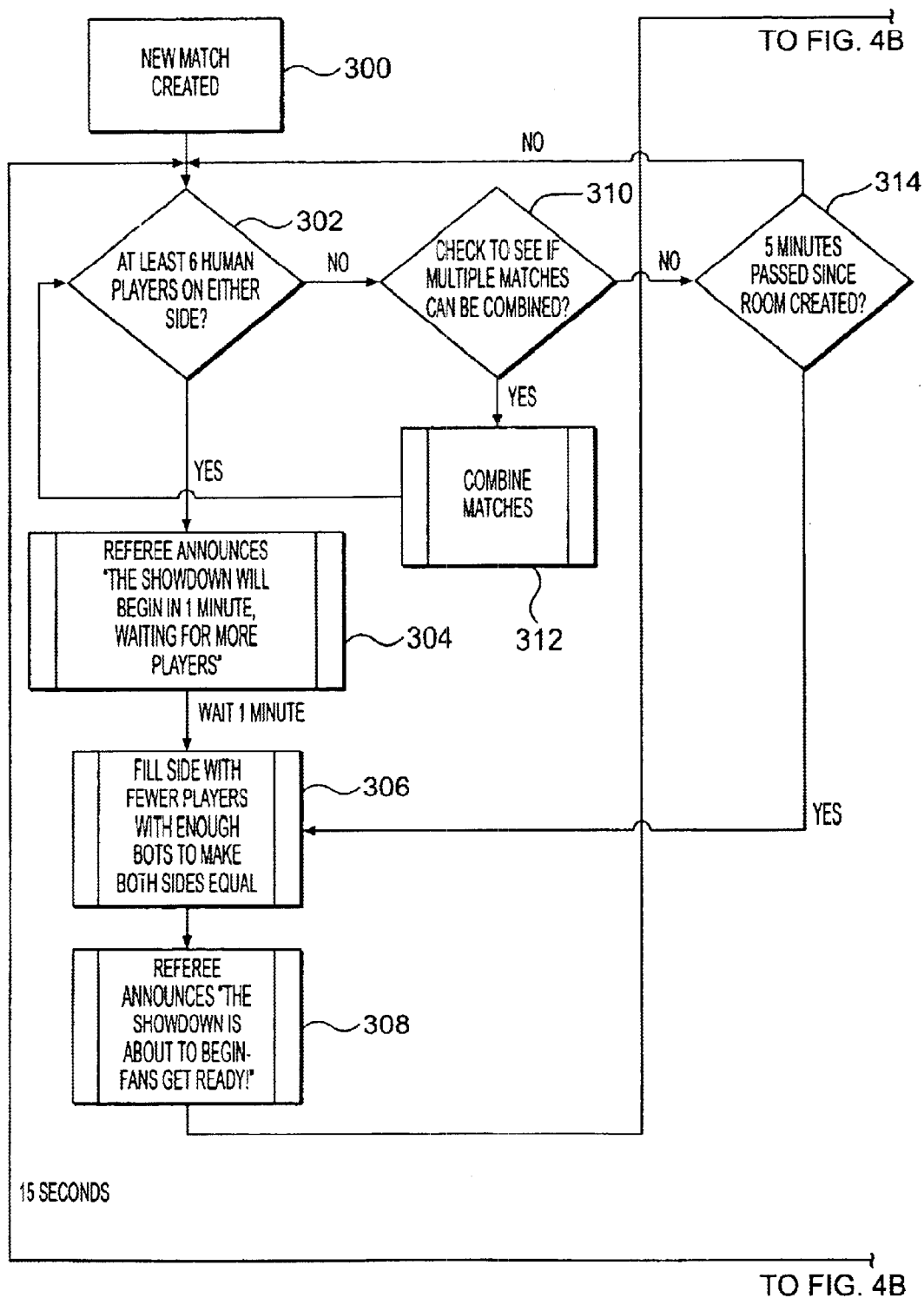
FIG. 4 is a flowchart of a method of login and registration according to an embodiment of the invention.
Figure 4B:
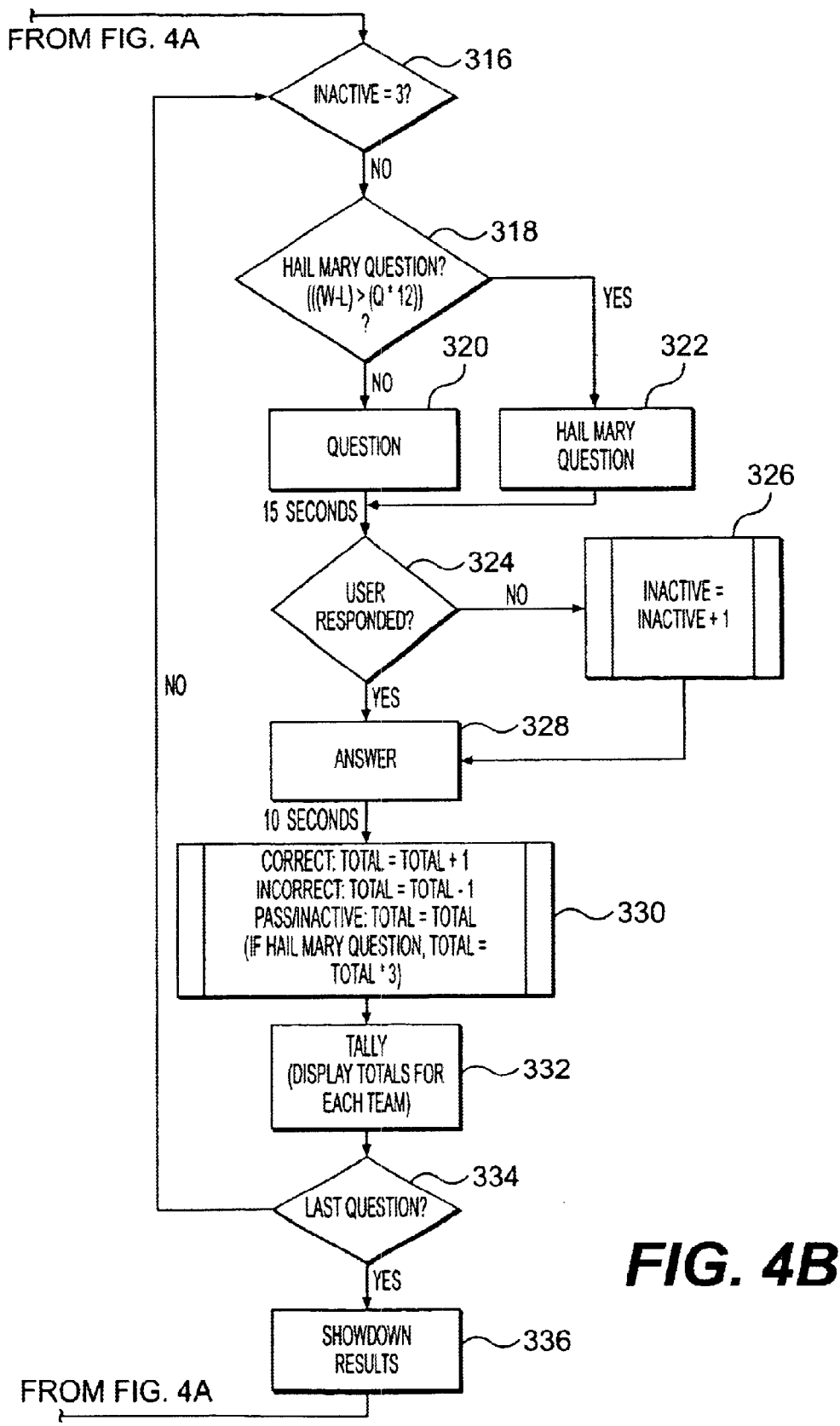

FIG. 4 illustrates a graphical user interface 250 according to an embodiment of the invention. Graphical user interface 250 displays the teams in competition and the roster of teams. Symbols or logos 252 and 254 may be used to identify Team A and Team B, respectively. Team A's roster 255 and Team B's roster 256 may be displayed under the appropriate logos. Each roster may list the players participating, including the bots. According to an embodiment of the invention, each player's name may provide a link to that player's personal trading card. Thus, a player may find out information about the other players.

A match scoreboard 258 may display the current score of the match. Other data may also be displayed, including how many more questions are left and other match information. A game scoreboard 259 may display the current combined score of all matches associated with a game. For example, suppose a game between the New York Jets™ and the New York Giants™ has a total of seventeen matches in progress. A graphical user interface 250 for one match between New York Jets™ fans and the New York Giants™ fans may display on match scoreboard 258 that the Jets™ fans are winning by a score of 47 to 38. Game scoreboard 259 may display that the Giants™ fans are winning the seventeen matches by a combined score of 510 to 390.

According to an embodiment of the invention, a question may be presented 260 and players may designate an answer at display 262. According to an embodiment of the invention, a player is presented with answer choices and a pass choice at display 262. A player answers or passes a question by designating a button or soft-key associated with an answer or pass. Other options may also be presented to a player.

Chat area 264 displays discussions between various players. A player may type in discussions for other players and read what players say. Other manners of presenting a graphical user interface may also be used.

An answer screen may comprise a status message, indicating the status of the answer (e.g., "Correct!", "Wrong!", "Time's Up!", "You Passed", etc.), a correct answer, a response, such as additional information regarding the answer, and a current match score. Other information may be displayed on an answer screen. According to an embodiment of the invention, after a pause for a predetermined period of time, a tally screen may be displayed and includes for each team, the number of players who answered a question correctly, and the number who answered the question incorrectly. A tally screen may also comprise the number of points scored on the question for each team, the total points after the question's points are added for each team, and whether the last question was a bonus question.

According to an embodiment of the invention, correct answers may be tallied at the same time for each team. As each correct answer is added to the total, the number next to a username in a roster list may be updated appropriately, e.g., each player who got the answer right would see both numbers (number of questions and number answered correctly) increment as the number of total (team) correct answers are added up. As noted previously, according to an embodiment of the invention, correct answers may be worth +1 point, incorrect answers may be worth −1 point, and passing may be worth 0 points. If the question is a bonus question, point values may be increased by a predetermined amount (e.g., points may be tripled). According to an embodiment of the invention, the total score for either a player or a team may not drop below zero points.

According to an embodiment of the invention, game flow may iterate through a question screen, an answer screen, and a tally screen until a predetermined number of questions have been presented. Once a predetermined number of questions have been presented, and the results have been tallied, a match result screen may be displayed.

The outcome of a match may be determined and announced, along with a personal tallying of a player's personal statistics and earned prize tickets. A match result screen may comprise displaying an outcome of a match, the number of questions in match, and the number of questions answered correctly by a player. According to an embodiment of the invention, a player may be awarded tickets based on tallied scores. Tickets may be used in a raffle for awarding prizes. The more tickets a player has accumulated, the better chance of winning a prize. Tickets may also be awarded to individual players based on their successful participation in team play, and who the team played. By way of example only, a player may be awarded one ticket for playing, a ticket for every correct answer, and a predetermined amount of bonus tickets if a player's team won. Additional tickets may be awarded if a player is playing for a designated favorite team, against a designated least favorite team, or on a designated favorite team against a designated least favorite team. Other methods for awarding tickets and/or prizes may be used.

According to an embodiment of the invention, in order to allow a side which is losing badly in a match to maintain a chance to win, a bonus question may be presented to teams. Bonus questions may be worth predetermined multiples of a normal question. According to an embodiment of the invention, bonus questions increase values both positively for correct answers and negatively for incorrect answers. Other scoring for bonus questions may also be used.

After points are tallied up for each question, a check may be made to determine whether a bonus question is asked. According to an embodiment of the invention, a check may be made of the winning team score W, the losing team score L, the number of questions remaining Q, and the total number of players on a team T. A system may determine whether to present a bonus question based on this information. According to a preferred embodiment of the invention, if $(W-L)>(Q*T)$, then there is a $(90-(10*Q))$ chance that a bonus question will be presented. According to an embodiment of the invention, only one bonus question is presented per match. By way of example only, suppose eight of twelve questions have been presented in a match and that Team A fans are beating Team B fans by a score of 58–6, a difference of 52 points. In this example, 52 (W−L) is greater than 48 (Q*12, or 4*12), and there is a $(90-(10*4))$ or 50% chance that the next question will be a bonus question.

According to an embodiment of the invention, computer-controlled players, or bots, may be used to balance the number of players on competing teams in a match. Bots may be treated like human players in that they accumulate statistics and have personal trading cards which can be viewed by clicking on their name. According to an embodiment of the invention, bots may answer questions correctly according to various predetermined accuracy rates. Some bots may be considered good, in that they are more likely to correctly answer a question, while some bots may be considered poor, in that they are more likely not to answer a question correctly. Bots may be randomly assigned to teams.

Accuracy rates may include the percentage chance of answering a question correctly, the percentage chance of answering a question incorrectly, and the percentage chance of passing on a question. Accuracy rates may vary with the difficulty of a particular question. For example, a bot may correctly answer a question with one level of difficulty 80% of the time, but only correctly answer a question with a higher level of difficulty 30% of the time. According to an embodiment of the invention, bots may answer questions at a level based on the rates of registered players. For example, if all registered players in the system correctly answer questions of a difficulty level of "A" (where "A" is some predetermined difficulty level) at a rate of 75%, bots would correctly answer on "A" question 75% of the time. Other accuracy rates and ways of determining accuracy rates may also be used.

Figure 5:
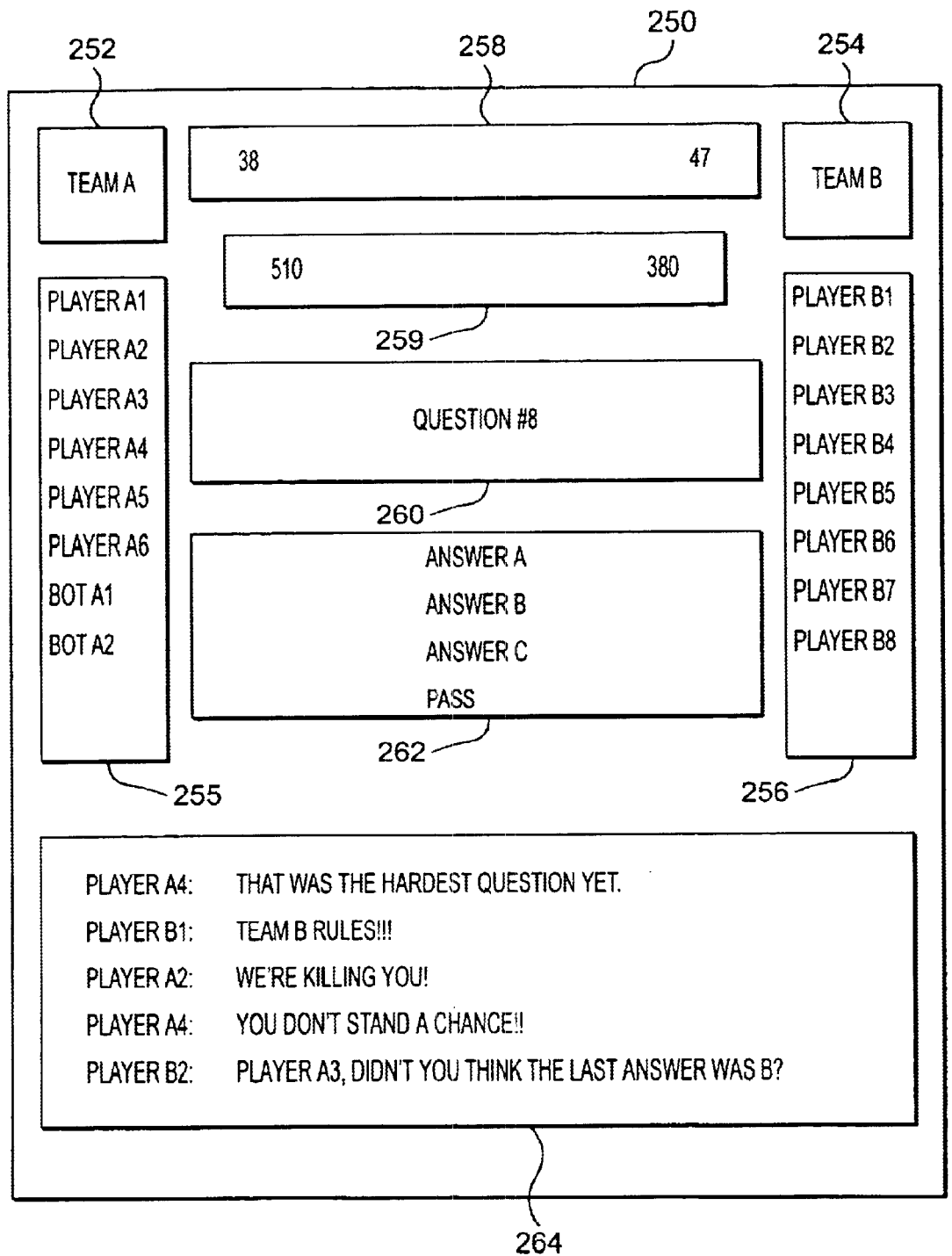
FIG. 5 illustrates a graphical user interface according to an embodiment of the invention.
Figure 6A:
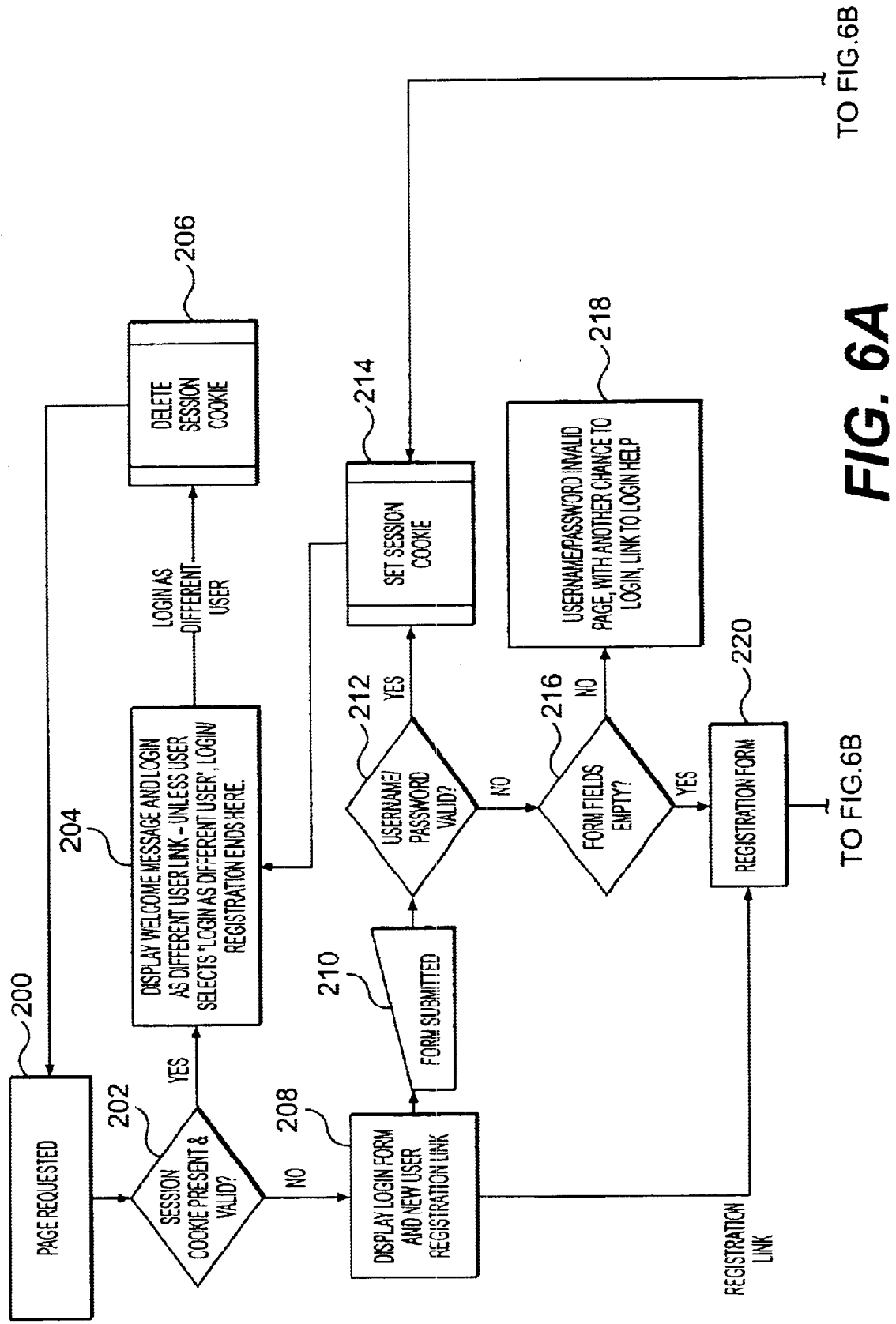
FIG. 6 is a flowchart of match play according to an embodiment of the invention.
Figure 6B:
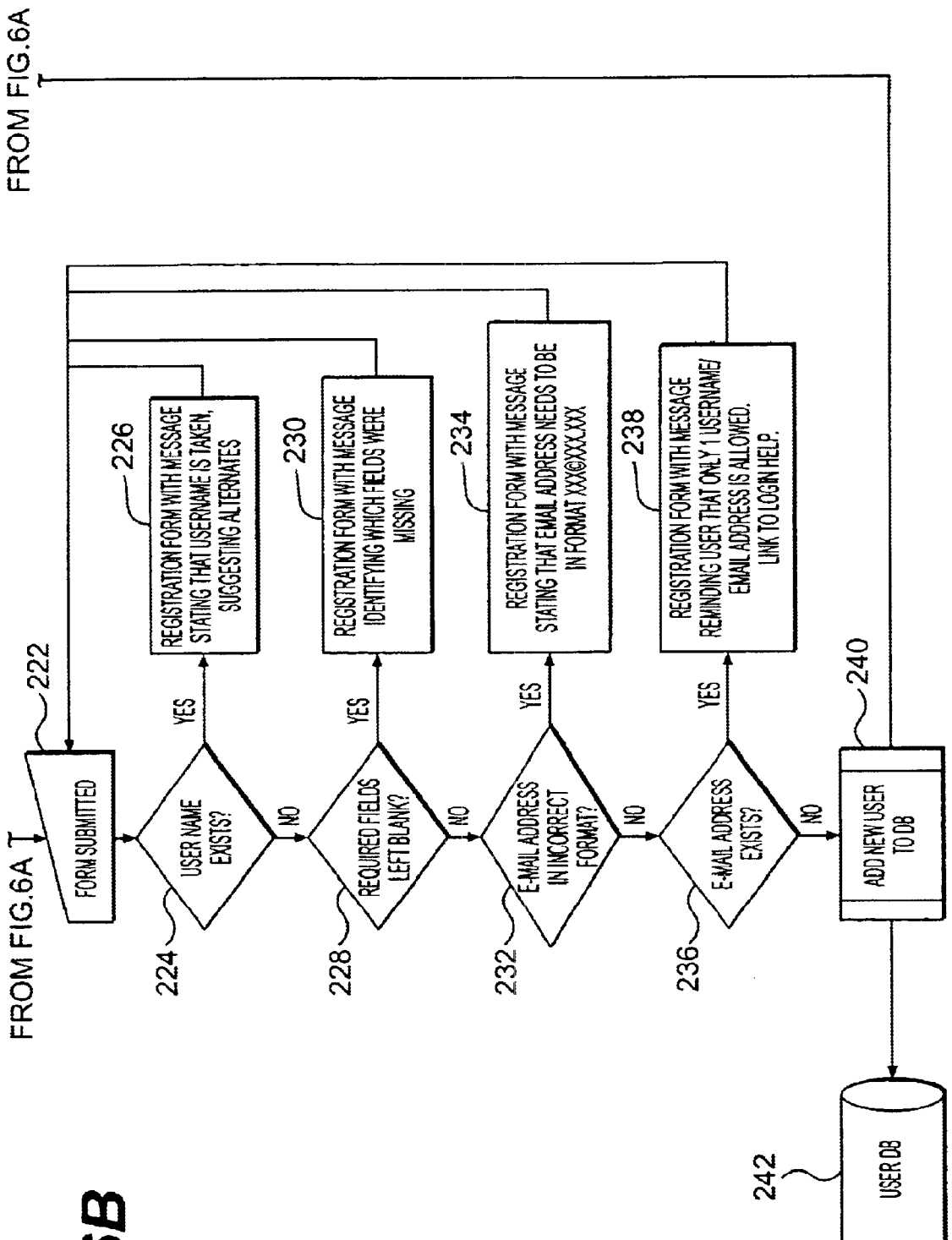

An embodiment of match play is described in reference to the flowchart of FIG. 5. According to an embodiment of the invention, a player may use a browser to access a web page having various web pages used in conjunction with the present invention. A new match is created at step 300. A system determines if there are at least a predetermined number of human players for each side. According to an embodiment of the invention, each side must have at least six human players. Other minimum numbers of human players may also be used. According to an embodiment of the invention, uneven matches may be played by altering the points awarded. For example, suppose a match between Team A and Team B had four human players for Team A and eight human Players for Team B. The points awarded for players on Team A may be worth twice as much as for the players on Team B. Other methods for conducting matches may also be used.

If the predetermined number of human players is present for both teams, the system announces at step 304 that the match is set to begin in a predetermined amount of time. According to an embodiment of the invention, the system announces that a match may be set to begin in one minute. Other amounts of time may also be used. After the predetermined amount of time has passed, bots (e.g., computer-controlled players) are added to the team with the fewer amount of human players to make each side equal at step 306. A message is displayed to the players at step 308. The message may indicate that the match is ready to begin. Other information may be included in the message.

If each team does not have at least a predetermined number of human players on each side, the system may check at step 310 to see if there are multiple matches that can be combined. If there are, the matches are combined at step 312 and the system returns to step 312 to determine if each team in a match has at least a predetermined number of human players. If no matches can be combined, the system determines if a predetermined time period has passed since the match was created at step 314. According to an embodiment of the invention, the system may determine if five minutes have passed since the match was created. Other time periods may also be used. If the predetermined time period has not passed, the system may return to step 302 and determine if each team has a predetermined number of human players. If the predetermined time period has passed, the system may move to step 306 and add bots to provide even teams.

After a message announcing the beginning of a match is displayed at step 308, the system checks at step 316 if a player's inactive counter has reached a predetermined number. According to an embodiment of the invention, an inactive counter must be three before a player is considered inactive. Other predetermined numbers for determining whether a player is inactive may also be used. The check may be made to assure that players have not forgotten to log out when they have quit the match. If a player is inactive three times, the system may log out a player.

If a player is not inactive, the system determines whether a bonus question should be presented to players at step 318. According to an embodiment of the invention, a bonus question may occur when a specified percentage of the time when (W–L)>(Q*T), where W is the winning teams score, L is the losing teams score, Q is the total number of questions, and T is the number of players on a team. Other methods for determining whether a bonus question is asked may also be used.

If no bonus question is to be asked, a question is presented to the players at step 320. If a bonus question is to be asked, a bonus question is presented to the players at step 322. The system determines if a player has responded to a question at step 324. If a player has not responded, a one is added to a player's inactive counter at step 326.

Regardless of whether a player is considered inactive or not, an answer to the question may be provided at step 328. According to an embodiment of the invention, an answer may include the correct answer to the question as well as additional information about the circumstance of the question (e.g., historical context, etc.). Other information may also be included.

Points for each player are awarded at step 330. According to an embodiment of the invention, each player receives one point for a correct answer, minus one point for an incorrect answer, and no points for a pass. Bonus question values may be multiplied by three. Other methods of awarding points may also be used. The point totals for each player and each team are tallied at step 332.

The system determines if the previous question was the last question in the match at step 334. If not, the system returns to step 316 and determines if a player's inactive counter is at a predetermined threshold. If the last question has been asked, match results are displayed at step 336. Match results may comprise the final score, the record of the teams, and various player and team statistics. Other information may also be displayed. The system may then return to step 302 to start a new match. Other methods and processes for match flow may also be used.

At a web shell page(s), there may be a "login box." When a page containing a login box is requested, the system may check for the presence of an electronic marker indicated a player has previously logged in, such as a session cookie, on player's browser. If a session cookie is not present or doesn't contain a validity key, a player may be required to log in to the system. If a session cookie is present and recognized, the user may be considered logged in.

For example, if a player is not logged in (e.g., a session cookie is not present or is invalid), a login box may contain the message "Enter your user name and password below—If you're a new user, <link to registration>click here to sign-up and get into the action<link>." A login box may contain a form with a user name field, a password field, and a submit button. A login box may comprise other fields.

If a player is logged in (e.g., a session cookie is present and valid), a login box may contain the following message: "Welcome, <User Name>! Click on your name above to see your personal Trading Card." Clicking on the name may open a new window which may display a player's personal trading card.

Figure 3:
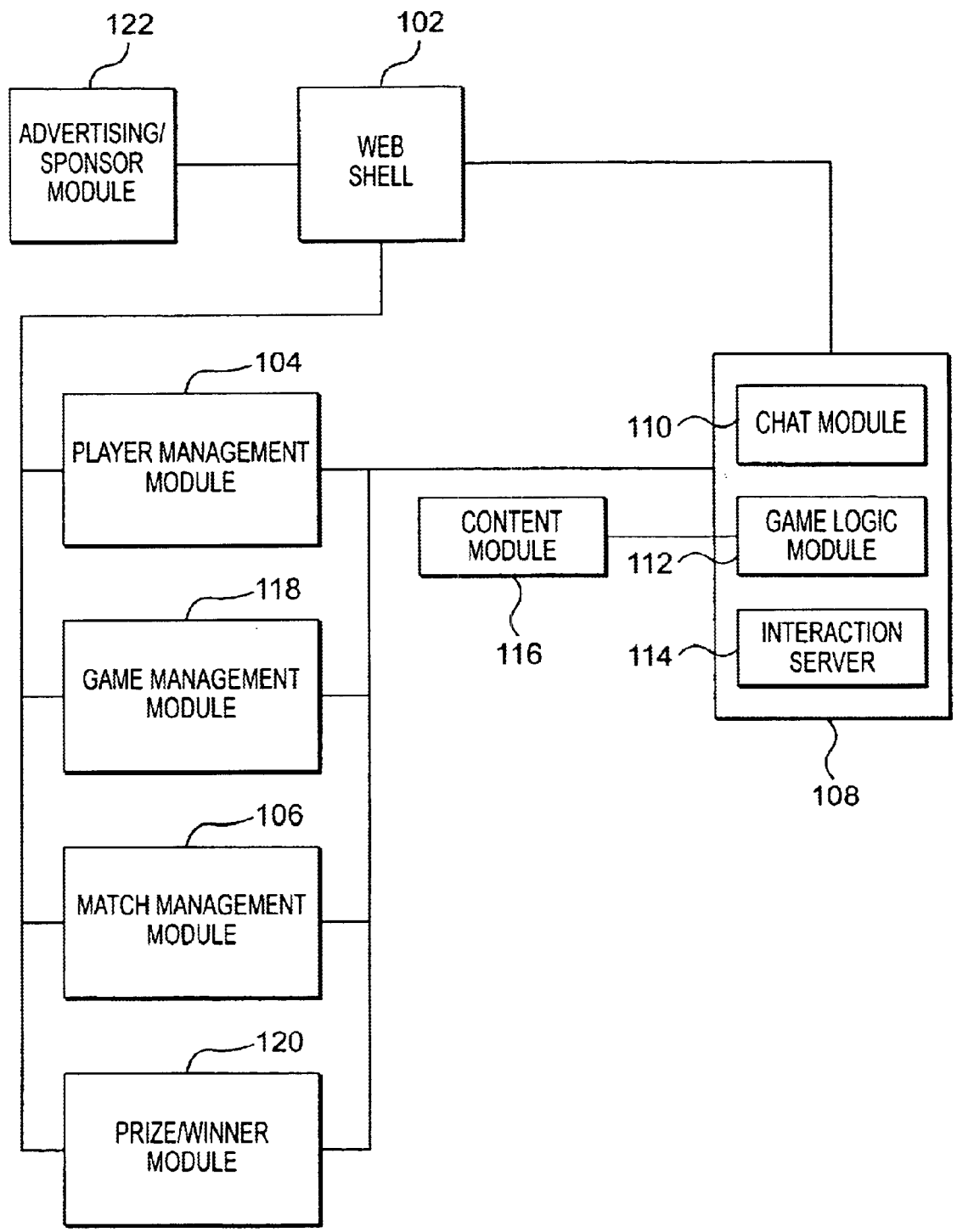
FIG. 3 depicts a schematic diagram of a system according to an embodiment of the invention.

An embodiment of a login and registration process is described in reference to the flowchart of FIG. 3. According to an embodiment of the invention, a player may use a browser to access a web page having various web pages. An appropriate page is requested at 200. A system determines if a valid cookie is present at step 202. If a cookie is present and valid, a message may be displayed at step 204, welcoming a player and providing access to the web site. If a player selects to login as a different user (e.g., a person has more than one user name, or a different person is using someone else's computer), a cookie is deleted at step 206 and the system returns to step 200.

If a cookie is not found or is not valid, a login form and new player registration link are displayed at step 208. A form is submitted at step 210, and a system determines if the username and password are valid at step 212. If valid, a cookie is set at step 214, and the welcome screen of step 204 is displayed to the player. If a username and/or password is not valid, the system checks if the form fields were left empty at step 216. If the form fields were not empty, a page may be displayed at step 218, indicating that the username/password is invalid. A player may be presented with another opportunity to login, or may be presented with a login help page.

If form fields are empty, a registration form is presented at step 220. Additionally, a player may activate a new user registration link displayed at step 208, and be presented with a registration form at step 220. A player completes and submits the form at step 222, and the system determines if the submitted username exists at step 224. If a username exists, a message is displayed at step 226 indicating that the username is taken. Alternate usernames may be suggested. A player is then returned to submit a new registration form at step 222.

If a username does not exist, the system determines if any of the required fields have been left blank at step 228. If one or more fields has been left blank, a message is displayed to a player at step 230. The message may identify which required fields were left blank, and may return a player to submit a completed form at step 222.

If all of the required fields have been completed, the system determines if an e-mail address provided on the form is in an incorrect format at step 232. If the e-mail address is incorrect, a message is displayed to a player at step 234. A message may inform a player that the e-mail format is incorrect, and suggest an appropriate format. A player may then be returned to submit a registration form with a correct e-mail address at step 222.

If the e-mail address is in a correct format, a system may determine if the e-mail exists in the system database at step 236. If an e-mail address exists, a message is displayed to a player at step 238, informing a player that only one username per e-mail address is allowed. Other messages may also be displayed. A player may be returned to submit a form with a new e-mail address at step 222.

If an e-mail address does not exist, a new player is added to a database at step 240, and information is sent to the database at step 242. A session cookie is set at step 214, and a player receives a welcome message at step 204, and access to the web site. Other processes for login and registration may also be used.

A login help page may be associated with Player Management Module 102, and may be linked from error pages. An error page may result when a player tries to login with non-existent username, tries to login with an incorrect password for username, or tries to register with an e-mail address which already exists in the database (is already registered). Other errors could also occur.

A login help page may display a text message to a player indicating the nature of the error and suggesting an appropriate remedy. For example, a login help page may request that a player enter an e-mail address into an entry box and send it to the system administrator. The system administrator may then send the appropriate username and password to the player by e-mail. If an entry box is left blank, a login help page may prompt a player to enter their e-mail address if they want to enter the game. If an e-mail address does not match a registered user, a login help page may prompt a player to correct the e-mail address entered or to register as a new user. If an e-mail address is correct, a system administrator may send an appropriate username and password to a player at the submitted e-mail address. Other manners of aiding players in logging on to a system may also be used.

According to an embodiment of the invention, a player may change user information. According to an embodiment of the invention, an edit player information link may link to a page with a form interface allowing a player to change portions of a player profile. At the top of the page, a password entry field may need to be filled in correctly in order for changes to occur. A player may be able to change the address, city, state, zip code, team affiliation, team rivalry, or password. According to an embodiment of the invention, changing team affiliation and team rivalry may result in presenting a pull-down list of all available teams to a player, and selecting from the list. Other methods for changing information may also be used.

Content management module 116 may provide content to match manager 108, and more specifically game logic module 112. Content management module may store question data, and may be responsible for composing and distributing the data to the match manager 108. Question data may comprise a question, a correct answer, a number of incorrect answers, a factoid about the answer, and a difficulty level. Questions may be presented randomly. Context management module 116 may contain other content.

Game management module 118 may maintain a pool of current games or matches, a schedule of games for a season, scores of current games, a team's win/loss record, and other match information.

Prize/winner module 120 may govern awarding prizes in relation to competition. According to an embodiment of the invention, prizes may be awarded on a monthly basis, with one "Player's Prize" given away for each team affiliation. A "Grand Prize" may be given to a single winner from an entire pool of players. As noted previously, prizes may be awarded based on the number of "prize tickets" earned, where prize tickets function as raffle tickets with each prize ticket counting as one chance to win out of the total number of tickets awarded. Other methods for awarding prizes may also be used.

According to an embodiment of the invention, prize ticket totals may be carried over from month to month. A player may be required to have played at least once during that month to be eligible to win a prize. If a player is selected who hasn't played in over a month, the selection may be disregarded and a new drawing may occur. According to an embodiment of the invention, a player cannot win a prize two months in a row. If a player who has won the previous month is selected, a new drawing may occur. A list of winner may be displayed on a recent winners page.

Advertising/sponsorship module 122 may coordinate sponsor and advertising information. According to an embodiment of the invention, a sponsor web page may sponsor an online trivia game on its web site, and provide advertising banners on the web site. Advertising/sponsor module 122 may coordinate the competitions and the advertising, thereby allowing efficient use of the web site. Advertising/sponsor module 122 may also perform other functions.

According to another embodiment of the invention, a computer usable medium having computer readable program code embodied therein for an electronic competition may be provided. For example, the computer usable medium may comprise a CD ROM, a floppy disk, a hard disk, or any other computer usable medium. One or more of the modules of system 100 may comprise computer readable program code that is provided on the computer usable medium such that when the computer usable medium is installed on a computer system, those modules cause the computer system to perform the functions described.

According to one embodiment, web shell 102, player management module 104, match management module 106, match module 108, chat module 110, game logic module 112, interaction server 114, content module 116, game management module 118, prize/winner module 120, and advertising module 122 may comprise computer readable code that, when installed on a computer, perform the functions described above. Also, only some of the modules may be provided in computer readable code.

According to one specific embodiment of the present invention, system 100 may comprise components of a software system. System 100 may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A method for computer-implemented game-play comprising:
   identifying a plurality of players, each player associated with one of a plurality of teams based on a player profile indicating a real-life participant preference, each team relating to a real-life participant in a scheduled event;
   matching two or more teams for one or more contests corresponding to the real-life scheduled event involving one or more real-life participants; and
   performing the one or more contests;
   wherein the real-life scheduled event involving real-life participants is different from the one or more contests involving the plurality of players.

2. The method according to claim 1, further comprising the step of awarding a score to each of the plurality of players based on the results of the one or more contests.

3. The method according to claim 1, wherein each player has a player profile displayed in the form of a player trading card, the player profile comprises at least one of:
   a) an image of the player;
   b) statistics of the players play;
   c) the name of the player; and
   d) the affiliation of the player to a real-life entities.

4. The method according to claim 1, wherein the step of matching the plurality of teams includes matching the two or more teams based on a real-life sports schedule.

5. The method according to claim 1, wherein the step of performing the one or more contests further comprises:
   a) presenting the plurality of players with a plurality of questions;
   b) tallying the answers for each team for each of the plurality of questions; and
   c) tallying the answers for each of the plurality of players for each of the plurality of questions; and
   wherein the step of awarding a score further includes awarding a score to each of the plurality of players based on at least one of the tally for each team and the tally for the player.

6. The method according to claim 1, wherein a player utilizes a game-play system operatively connected over a distributed network environment to a server.

7. A method for computer-implemented game-play comprising:
   logging in a plurality of players, each player associated with a selected one of a plurality of entities;
   placing each player on a team based on being associated with one of a plurality of entities;
   matching the plurality of teams for one or more contests; and
   performing the one or more contests;
   wherein the plurality of entities are different from the plurality of players.

8. The method according to claim 7, further comprising the step of awarding a score to each of the plurality of players based on the results of the one or more contests.

9. The method according to claim 7, wherein each player has a player profile displayed in the form of a player trading card, wherein the player profile comprises at least one of:
   a) an image of the player;
   b) statistics of the players play;
   c) the name of the player; and
   d) the affiliation of the player to a real-life entity.

10. The method according to claim 7, wherein:
    a) the step of performing the one or more contests further comprises:
       i) presenting the plurality of players with a plurality of questions;
       ii) tallying the answers for each team for each of the plurality of questions; and
       iii) tallying the answers for each of the plurality of players for each of the plurality of questions; and
    b) wherein the step of awarding a score further includes awarding a score to each of the plurality of players based on at least one of the tally for each team and the tally for the player.

11. The method according to claim 7, wherein the selected entity is a real-life entity; and
    wherein the step of matching teams for the one or more contests including matching teams based on a real-life schedule of events.

12. The method according to claim 7, wherein a player utilizes a game-play system operatively connected over a distributed network environment to a server.

13. The method according to claim 7 wherein the step of matching further comprises the steps of:
    determining match-up criteria wherein match-up criteria relates to an equal number of players on each team and
    implementing a computer controlled player based on the match-up criteria.

14. A system for controlling game-play, in which a plurality of players, participate in one or more contests through input/output devices connected to a central server which manages the one or more contests, the system comprising:
    means for uniquely identifying a plurality of players;
    means for assigning the plurality of players connected over a network to the central server to a team for the one or more contests; wherein the means for assigning is based on a player profile indicating a real-life participant preference;
    means for matching the plurality of teams to participate in the one or more contests corresponding to a real-life schedule of events involving the real-life participant; and
    means for enabling the players to compete in the one or more contests based on the real-life schedule of events;
    wherein the real-life participant and each player are different.

15. The system according to claim 14, wherein the plurality of teams are based on real-life sports team, and
    wherein matching the plurality of teams includes matching the plurality of teams based on a real-life sports schedule.

16. The system according to claim 14, further comprising means for displaying a player profile for each player in the form of a player trading card, wherein a player profile comprises at least one of:
 a) an image of the player;
 b) contest statistics of the player;
 c) the name of the player; and
 d) the affiliation of the player to a real life party.

17. The system according to claim 14, wherein:
 a) means for enabling a plurality of players to compete further comprises means for presenting the plurality of players with a plurality of questions; and
 b) further comprising means for storing player information, wherein the storing means further comprises:
  i) means for tallying the answers for each team for each of the plurality of questions;
  ii) means for tallying the answers for each of the plurality of players for each of the plurality of questions; and
  iii) means for awarding a score to each of the plurality of players based on at least one of the tally for each team and the tally for the player.

18. A system for controlling game-play, in which a plurality of players participate in one or more contests through input/output devices connected to a central server which manages the one or more contests, the system comprising:
 means for uniquely identifying a plurality of players;
 means for assigning the plurality of players connected over a network to a central server to a team for the one or more contests;
 means for grouping players into a plurality of teams based on an entity selected by the player;
 means for matching the plurality of teams to participate in the one or more contests; and
 means for enabling the players to compete in the one or more contests;
 wherein the selected entity and each player are different.

19. The system according to claim 18, wherein the selected entity is a real-life entity, and
 wherein matching the plurality of teams includes matching the plurality of teams based on a real-life schedule.

20. The system according to claim 18, further comprising means for displaying a player profile for each player in the form of a player trading card, wherein a player profile comprises at least one of:
 a) an image of the player;
 b) contest statistics of the player;
 c) the name of the player; and
 d) the affiliation of the player to a real-life entity.

21. The system according to claim 18, wherein:
 a) means for matching a plurality of teams to compete further comprises means for presenting each of the plurality of players on the plurality of teams with a plurality of questions; and
 b) further comprising means for storing player information, wherein the storing means further comprises:
  i) means for tallying the answers for each team for each of the plurality of questions;
  ii) means for tallying the answers for each of the plurality of players for each of the plurality of questions; and
  iii) means for awarding a score to each of the plurality of players based on at least one of the tally for each team and the tally for the player.

22. The system according to claim 18 where the means for matching further comprises:
 means for determining match-up criteria wherein match-up criteria relates to an equal number of players on each team and
 means for implementing a computer controlled player based on the match-up criteria.

23. A player system for enabling a player having a selected association with a real-life participant in a scheduled event to participate in one or more contests offered by a contest system connected to the player system over a network server which manages the contests, the player system comprising:
 contest display means for displaying an assignment of a plurality of players to a team for the one or more contests based on a player profile indicating a real-life participant preference and a matching of a plurality of teams to participate in one or more contests corresponding to the real-life scheduled event;
 input means for enabling the player to participate in the contest by responding to contest information; and
 receiving means for receiving results of player participation in the contest;
 wherein the real-life scheduled event involving real-life participants is different from the one or more contests involving the plurality of players.

24. The system according to claim 23, wherein the selected association is with a real-life sports team, and
 wherein matching teams includes matching teams according to a real-life sports schedule.

25. The system according to claim 23, further comprising player trading card means for displaying a player profile for each player, wherein a player profile comprises at least one of:
 a) an image of the player;
 b) contest statistics of the player;
 c) the name of the player; and
 d) the affiliation of the player to a real life entity.

26. The system according to claim 23, wherein:
 a) means for enabling a plurality of players to compete further comprises means for presenting the plurality of players with a plurality of questions; and
 b) further comprising means for storing player information, wherein storing means further comprises:
  i) means for tallying the answers for each team for each of the plurality of questions;
  ii) means for tallying the answers for each of the plurality of players for each of the plurality of questions; and
  iii) means for awarding a score to each of the plurality of players based on at least one of the tally for each team and the tally for the player.

27. A player system for enabling a player having a selected association with an entity to participate in one or more contests offered by a contest system connected to the player system over a network server which manages the contests, the player system comprising:

contest display means for displaying an assignment of a plurality of players to a team for the one or more contests and a matching of a plurality of teams to participate in the one or more contests wherein the matching is based on the selected entity;

input means for enabling the player to participate in the contest by responding to contest information; and receiving means for receiving results of player participation in the contest;

wherein the selected entity and each player are different.

28. The system according to claim 27, further comprising player trading card means for displaying a player profile for each player, wherein a player profile comprises at least one of:
  a) an image of the player;
  b) contest statistics of the player;
  c) the name of the player; and
  d) the affiliation of the player to a real life entity.

29. The system according to claim 27, wherein the selected entity is a real-life entity, and
  wherein matching the plurality of teams includes matching the plurality of teams based on real-life scheduled events.

30. The system according to claim 27, wherein:
  a) means for enabling a plurality of players to compete further comprises means for presenting the plurality of players with a plurality of questions; and
  b) further comprising means for storing player information, wherein storing means further comprises:
    i) means for tallying the answers for each team for each of the plurality of questions;
    ii) means for tallying the answers for each of the plurality of players for each of the plurality of questions; and
    iii) means for awarding a score to each of the plurality of players based on at least one of the tally for each team and the tally for the player.

31. The system according to claim 27, further comprising:
  determining means for determining match-up criteria wherein match-up criteria relates to an equal number of players on each team and
  implementing means for implementing a computer controlled player based on the match-up criteria.

* * * * *